US010763768B2

(12) United States Patent
Hu et al.

(10) Patent No.: US 10,763,768 B2
(45) Date of Patent: Sep. 1, 2020

(54) ON-LOAD TAP CHANGER AND MANUFACTURING METHOD THEREOF

(71) Applicant: ABB Power Grids Switzerland AG, Baden (CH)

(72) Inventors: Bo Hu, Anhui (CN); Xin Zhao, Anhui (CN); Huigang Sun, Beijing (CN)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/453,153

(22) Filed: Jun. 26, 2019

(65) Prior Publication Data
US 2019/0363657 A1 Nov. 28, 2019

Related U.S. Application Data

(63) Continuation of application No. PCT/CN2016/113781, filed on Dec. 30, 2016.

(51) Int. Cl.
*H02P 13/00* (2006.01)
*H02P 13/06* (2006.01)
(Continued)

(52) U.S. Cl.
CPC .............. *H02P 13/06* (2013.01); *G05F 1/153* (2013.01); *H02M 1/10* (2013.01)

(58) Field of Classification Search
CPC ........ H01F 29/00; H01F 29/02; H01F 29/025; H01F 29/04; G05F 1/10; G05F 1/12
See application file for complete search history.

(56) References Cited

U.S. PATENT DOCUMENTS

| 6,124,726 A | 9/2000 | Dohnal et al. |
| 2006/0028235 A1 | 2/2006 | Rapant et al. |

(Continued)

FOREIGN PATENT DOCUMENTS

| CN | 101976893 A | 2/2011 |
| CN | 203734579 U | 7/2014 |

(Continued)

OTHER PUBLICATIONS

State Intellectual Property Office of the P.R. China, International Search Report & Written Opinion issued in corresponding Application No. PCT/CN2016/113781, dated Oct. 11, 2017, 11 pp.
(Continued)

Primary Examiner — Adolf D Berhane
Assistant Examiner — Afework S Demisse
(74) Attorney, Agent, or Firm — Sage Patent Group

(57) ABSTRACT

An on-load tap changer that includes an actuator configured to adjust a turn ratio of the transformer, and a processing unit configured to control the actuator and to communicate with a control device via a digital signal connection. The processing unit is further configured to receive a status detected by a sensor. A method of manufacturing the on-load tap changer is also disclosed. Embodiments according to the present disclosure provide a digitalized on-load tap changer that allows various statuses to be monitored or controlled, by which various advantages can be achieved. For example, the life of a contact of the transformer can be predicted. Other data can be used to determine whether it is safe to adjust the contact of the transformer. Moreover, the optical fibers between the on-load tap changer and an external device enable an isolated transmission of control and data signals that almost eliminates interferences.

16 Claims, 2 Drawing Sheets

(51) Int. Cl.
*G05F 1/153* (2006.01)
*H02M 1/10* (2006.01)

(56) References Cited

U.S. PATENT DOCUMENTS

2007/0118831 A1* 5/2007 Kondo ............. H04N 21/44218
                                              717/121
2010/0241286 A1  9/2010 Thrornell-Pers
2017/0331364 A1* 11/2017 Giguere ............. H02M 1/4241

FOREIGN PATENT DOCUMENTS

| DE | 19744465 C1 | 3/1999 |
| GB | 2158253 B | 6/1987 |
| JP | H05120945 A | 5/1993 |
| JP | 2007035896 A * | 2/2007 |
| WO | 2007117696 A2 | 10/2007 |

OTHER PUBLICATIONS

Extended European Search Report dated Jun. 15, 2020 for European Patent Application No. 16925657.5, 8 pages.

* cited by examiner

ON-LOAD TAP CHANGER AND MANUFACTURING METHOD THEREOF

TECHNICAL FIELD

Example embodiments disclosed herein generally relate to a tap changer, and more particularly to an on-load tap changer and a method of manufacturing the on-load tap changer.

BACKGROUND

A tap changer is a mechanism used with transformers which allows for variable turn ratios to be selected or adjusted in discrete steps. Transformers with this mechanism obtain the variable turn ratio by connecting to a number access points known as taps along either the primary or secondary winding. A typical tap changer usually possesses tens of taps and allows for a certain percentage of variation (for example, ±10%) from the nominal transformer rating which, in turn, allows for stepped voltage regulation of the output.

Tap changers exist in two primary types: no load tap changers (NLTC) which must be de-energized before the turn ratio is adjusted and on-load tap changers (OLTC) which may adjust the turn ratio during operation. For many power transformer applications, a supply interruption during a tap change is unacceptable, and the transformer is often fitted with a more expensive and complex OLTC mechanism. OLTCs may be generally classified as mechanical, electronically assisted, or fully electronic. However, existing OLTCs normally utilize analog means to adjust the turn ratio and indicate the current selection of the turn ratio. The analog means is usually weak in terms of precision and functionality.

SUMMARY

Example embodiments disclosed herein propose on-load tap changers and a method of manufacturing the on-load tap changers.

In one aspect, example embodiments disclosed herein provide an on-load tap changer. The on-load tap changer includes: an actuator configured to adjust a turn ratio of the transformer, and a processing unit configured to control the actuator and to communicate with a control device via a digital signal connection. The processing unit is further configured to receive a status detected by a sensor.

In another aspect, example embodiments disclosed herein provide an on-load tap changer. The on-load tap changer includes: an actuator configured to adjust a turn ratio of a transformer, and a processing unit configured to communicate a control command with the control device and control the actuator based on the control command. The processing unit is further configured to estimate a contact wear based on a current flowing through a contact of the transformer and a material of the contact of the transformer.

In yet another aspect, example embodiments disclosed herein provide a method of manufacturing an on-load tap changer. The method includes: providing an actuator configured to adjust a turn ratio of the transformer, and providing a processing unit configured to control the actuator and to communicate with a control device via a digital signal connection. the processing unit is configured to receive a status detected by a sensor.

In yet another aspect, example embodiments disclosed herein provide a method of manufacturing an on-load tap changer. The method includes: providing an actuator configured to adjust a turn ratio of a transformer, and providing a processing unit configured to communicate a control command with the control device and to control the actuator based on the control command. The processing unit is configured to estimate a contact wear based on a current flowing through a contact of the transformer and a material of the contact of the transformer.

Through the following description, it would be appreciated that the device, system or method according to the present disclosure provides a digitalized on-load tap changer that allows various statuses to be monitored or controlled, by which various advantages can be achieved. For example, the life of a contact of the transformer can be predicted in addition. Other data can be used to determine whether it is safe to adjust the contact of the transformer. Moreover, the optical fibers between the on-load tap changer and an external device enable an isolated transmission of control and data signals that almost eliminates interferences.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
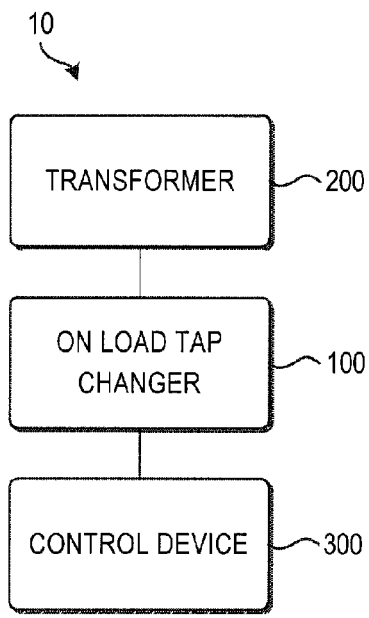
FIG. 1 illustrates a schematic diagram of an overall system in accordance with one example embodiment.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the several views of FIGS. 1-3. Other definitions, explicit and implicit, may be included below.

Figure 2:
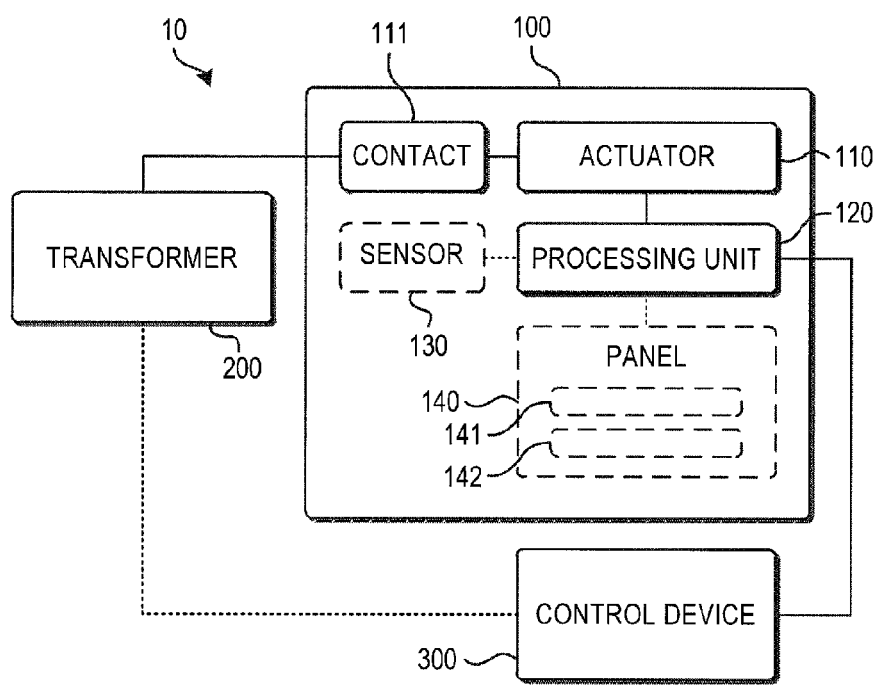
FIG. 2 illustrates a schematic diagram of an on-load tap changer in accordance with one example embodiment.

FIG. 1 illustrates a schematic diagram of an overall system 10, including an on-load tap changer 100, a transformer 200 and a control device 300, in accordance with one example embodiment. FIG. 2 illustrates a schematic diagram of an on-load tap changer 100 in accordance with one example embodiment. In the following, an on-load tap changer 100 will be described with respect to FIGS. 1 and 2 from different perspectives.

As shown in FIG. 1, a system 10 includes an on-load tap changer 100 (which is referred to as "OLTC" hereinafter), a transformer 200 and a control device 300. The transformer 200 includes a number of taps providing a set of selections of turn ratios of windings of the transformer 200, which in turn adjust the voltage output. A tap selection contact is switchable among the taps, and each selection corresponds to a particular turn ratio for the windings 210. Normally, the tap selection contact, or simply contact, is a part of the OLTC 100 (which is shown in FIG. 2 denoted by "111"). However, it should be understood that the contact can be a standalone mechanism if desired. The contact can be driven by a linkage mechanism of the OLTC 100 connected to an actuator or as a part of the actuator, which is to be explained in the following paragraphs.

In some situations, signals may communicate between the transformer 200 and the OLTC 100. In this way, sensor(s) in the transformer 200 may detect a status or various statuses of the transformer 200, and the detected results or data can be transmitted to the OLTC 100. For example, a current flowing through the contact and an output voltage of the transformer 200 may be detected. Such a mechanism will be explained in the following with respect to FIG. 2.

In one embodiment, a control device 300 is connected to the OLTC 100 via a cable that transmits digital signals. The presence of the control device 300 allows for a local or remote control of the OLTC 100 which in turn adjusts the turn ratio of the transformer 200. In one example, the control device is a supervisory control and data acquisition (SCADA) device, which can be used to monitor and control on-site equipment such as a transformer of the present disclosure, in order to achieve various functions such as data acquisition, control of devices, measurement, adjustment of parameters, and alarming. The availability of the control device 300 is advantageous, because an operator no longer needs to access a panel of the OLTC 100 for adjusting the turn ratio. Commonly, the control device 300 can be located anywhere preferable in the factory/plant for a remote control. This not only benefits an operator in terms of convenience, but also improves safety levels especially in cases that the transformer is located in a hazardous environment to human beings.

It is to be understood that although the OLTC 100 is shown to be separated from the transformer 200, the present disclosure does not intend to limit the correlation between the OLTC 100 and the transformer 200. In fact, the OLTC 100 can be external to the transformer 200 or integrated into the transformer 200 (for example, both can be contained in different tanks or in a common tank).

As shown in FIG. 2, the OLTC 100 includes a number of components that can be used to realize various functions. The OLTC 100 includes an actuator 110 and a processing unit 120. The actuator 110 is used for selecting the turn ratio by the linkage mechanism, which then adjusts a contact 111 as discussed with respect to FIG. 1 above. The contact 111 is connected to the actuator 110 in the OLTC 100, and sometimes the contact 111 can be seen as a part of the actuator 110. In principle, the actuator 110 is driven according to the processing unit 120 in order to move the contact 111, and thus the position of the contact in relation to the tap of the transformer 200 is changed accordingly.

Traditionally, the linkage mechanism is controlled by an operator manually, resulting in a cumbersome operation and bringing about safety concerns. The actuator 110 can be controlled by a relay. For example, the relay controls the rotational direction of a linkage rod which further rotates the contact 111 in order to rotate clockwise or counterclockwise in between tens of taps in the transformer 200.

In one embodiment, the processing unit 120 receives and processes commands from other devices such as an I/O device or a control device, so that it further controls the actuator 110 to adjust the turn ratio. The control device 300 discussed above may provide an I/O interface and a graphic interface to a user. In an example, the processing unit 120 communicates with the control device 300 via an optical fiber connection or an RJ45 connection. In this case, the control device 300 is able to receive a command from the user via the I/O interface and control the actuator 110 in the OLTC 100 via the processing unit 120.

In a particular example, the standard IEC (International Electrotechnical Commission) 61850 can be used for the communication between the OLTC 100 and the control device 300 via the optical fiber. Two optical fiber Ethernet ports may be provided on the OLTC 100. The ports belong to the processing unit 120 inside the OLTC 100.

A first port can be used for MMS (Multimedia Messaging Service)/GOOSE (Generic Object Oriented Substation Event) services, while the OLTC 100 serves as the MMS server and GOOSE publisher. The MMS is like a telephone call, or a one-to-one exchange of information/commands based on one party dialing the other to establish the connection with appropriate exchange of pleasantries to start a conversation. The GOOSE and Sampled Values are like a radio transmission—the message is sent out from an antenna to "everywhere" and doesn't identify who, or indeed if anyone is listening. Its job is to send (publish) messages.

In case that the OLTC 100 serves as the MMS server, it sends important signals to other devices in bay levels (defined in IEC 61850 standard for example, not to be explained in detail here) and the turn ratios can be controlled by the MMS service. On the other hand, if the OLTC 100 serves as the GOOSE publisher, it sends important signals to other devices (such as intelligent electronic devices, or IEDs) in process levels.

A second port can be used for Sample Values service while the OLTC 100 receives the Sample Values data stream. This is especially useful when current and voltage values need to be transmitted over the optical fiber toward the control device 300. It should be understood that the number of optical fiber cables is not to be limited by the present disclosure. The optical fiber connection established between the OLTC and the control device 300 provides an excellent isolation against electromagnetic interferences. Such isolation is beneficial, because an environment in which the transformer 200 is used is normally abundant in various radiations. In addition, the electrical and magnetic fields are typically strong, resulting in a susceptible signal transmission where ordinary digital or analog cables are used. Optical transmissions convert electrical signals into light signals for transmission over a long distance. In this way, harmful interferences can be eliminated effectively.

A sensor 130 is shown in a dashed block in FIG. 2 because it is optional. A sensor 130 is able to detect various statuses of the OLTC 100, and sometimes it can even detect a status of the transformer 200 if a signal route is provided between the transformer 200 and the OLTC 100. The sensor 130 is then connected to the processing unit 120 which is used to receive the detected statuses accordingly. For example, the sensor 130 can be a temperature sensor within an oil tank of the OLTC 100 for monitoring temperature of oil. Many other types of sensors can be utilized as well. The sensor 130 as well as the actuator 110 can be connected to an RS 485 communication port on the processing unit 120 for data transmissions.

In some embodiments of the present disclosure, various statues that can be detected include at least one of: an estimation of a contact wear based on a current flowing through a contact 111 of the OLTC 100 and a material of such a contact 111; times of the turn ratio having been adjusted in the OLTC 100; a viscosity of oil in an oil tank (not shown) of the OLTC 100; a slip of the contact 111 (the slip occurs when the contact 111 is moved by the actuator 110 excessively, causing the contact 111 missing the desired position); an overcurrent of the power of the actuator 110; a power loss of motor power of the actuator 110; a temperature within the oil tank; or a position of the contact 111 in relation to the taps of the transformer 200. Each of these statuses reflects an operation condition of the OLTC 100 or transformer 200, and thus would benefit an on-site monitoring of the overall system 10. Additional sensor(s) may be provided in the transformer 200 so that information on the output voltage of the transformer 200, for example, may be transmitted to the control device 300 for later use.

The current flowing through the contact 111 may be used to calculate or estimate a contact wear in addition to a material of the contact 111. The material is usually preset or known beforehand. In a simplified form, the contact wear can be estimated by $W = WF \cdot (I_{LOAD})^f$, where W represents the contact wear, WF represents a wear factor determined by the material of the contact provided by the supplier, $I_{LOAD}$ represents the current flowing through the contact, and f represents a load current exponent determined by the material of the contact provided by the supplier. The contact wear may be affected by other factors, such as the tap information. Therefore, by knowing the position of the tap selection contact 220 (namely, which tap it is connected to) and the properties of that particular tap, the contact wear may be estimated more accurately. In this way, the remaining life of the tap selection contact 220 can be estimated each time when the OLTC 100 adjusts the turn ratio. This information can be provided to the user, enabling a timely maintenance as a result.

In one embodiment, the processing unit 120 may prevent the actuator 110 from adjusting the turn ratio regardless of a control command from the operator or user, in cases that some requirements or prerequisites are fulfilled. For example, some harmful situations that are unwanted may include: the current flowing through the contact 111 is higher than a preset value; a voltage of the output of the transformer 200 is higher or lower than corresponding thresholds; a viscosity of oil in the oil tank in the OLTC 100 is higher or lower than corresponding thresholds; a current supplying the actuator 110 is too high; a slip of the contact 111 in relation to the taps of the transformer 200; or a power loss of the actuator 110. If one of these conditions is detected by the corresponding sensor 130 either in the OLTC 100 or in the transformer 200 (or calculated by the processing unit 120), the processing unit 120 refuses (irresponsive) to adjust the transformer 200 regardless the operator's control command (s), because such an adjustment may damage the transformer. In this way, the overall system 10 can always function smoothly in terms of safety.

In one embodiment, the control command discussed above may include raising a voltage of an output of the transformer 200, lowering the voltage of the output of the transformer 200, and stopping the actuator 110 from adjusting the turn ratio of the transformer 200. The stopping command may be helpful when the operator regrets a particular command made just now. As it usually takes the actuator 110 a while (normally several seconds) to finish the movement of the contact 111, such a movement can be "withdrawn" in time.

In one embodiment, the OLTC 100 may further include a panel 140, which is shown in a dashed block in FIG. 2. The panel 140 is connected to the processing unit 120 via a USB (Universal Serial Bus) cable for example for data transmissions. The panel 140 is able to indicate the detected statuses and receive a command from an operator to control the actuator 110 by the processing unit 120. In one example, the panel 140 includes a display 142 as a graphic interface for displaying the desired statuses such as a count of the turn ratio of the transformer 200 having been adjusted and a position of a contact of the transformer 200. In principle, any of the statuses discussed above can be displayed in the display 142 so that the user can understand how the transformer works. In one example, the display 142 is a touch-screen allowing the user to input or select commands. For example, the user may frag a bar shown in the display 142 so as to raise or lower the output voltage of the transformer 200 accordingly. Alternatively, the panel 140 may include one or more buttons so that the user can physically press the buttons for controlling the transformer 200. It should be understood that the buttons can be in various forms, such as press buttons, toggles, rotary knob, switches and the like.

The control device 300 may be able to realize most or all of the functions of the panel 140. For example, the detected statuses can be shown on the screen of the control device 300, and the user may control the OLTC 100 remotely by an I/O interface of the control device 300 when needed.

With the configuration according to the present disclosure, a digital OLTC can be constructed. The digitalized OLTC is able to monitor the statuses of the transformer in real time and indicate the information to the operator or user, so that one can know various conditions of the transformer. Due to the digitalization of the OLTC, a timely maintenance can be realized by monitoring the contact wear, an anti-interference transmission can be enabled between a local OLTC and a remote control device, and a safety mechanism can be deployed to prevent adjusting the transformer in a harmful condition.

Figure 3:
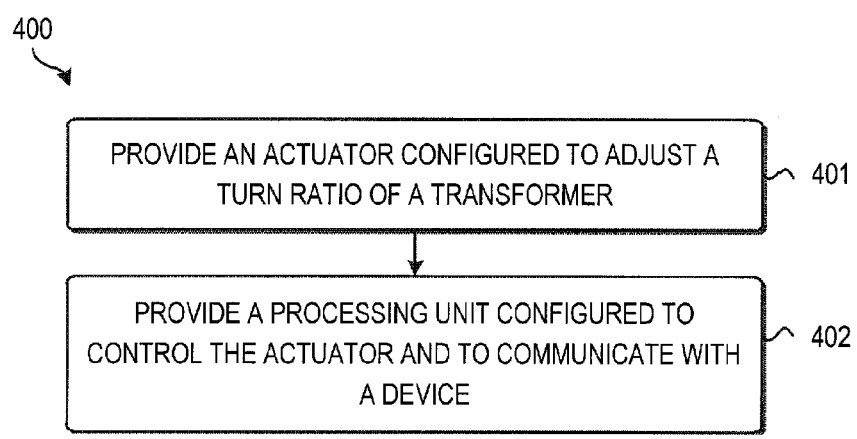
FIG. 3 illustrates a flowchart of a method of manufacturing an on-load tap changer in accordance with one example embodiment.

FIG. 3 illustrates a method 400 of manufacturing an OLTC in accordance with one example embodiment. At block 401, an actuator configured to adjust a turn ratio of the transformer is provided. At block 402, a processing unit configured to control the actuator and communicate with a control device is provided. In one example, the processing unit is configured to receive a status detected by a sensor. In some other examples, the processing unit is configured to estimate a contact wear based on a current flowing through a contact of the transformer and a material of the contact of the transformer. It is to be understood that the sequence of the method 400 is not necessarily the one discussed above. Moreover, all the features as described above in connection to FIGS. 1 and 2 apply to the method 400 and will not be repeated herein.

While operations are depicted in a particular order in the above descriptions, it should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An on-load tap changer, comprising:
   an actuator-configured to adjust a turn ratio of a transformer; and
   a processing unit configured to control the actuator and to communicate with a control device via a digital signal connection, the processing unit being further configured to receive a status detected by a sensor, wherein the processing unit is configured to communicate at least one of a control command or the status with the control device, the processing unit being configured to control the actuator based on the control command; and
   a panel connected to the processing unit and configured to indicate the status and receive the control command for controlling the actuator.

2. The on-load tap changer according to claim 1, wherein the digital signal connection is an optical fiber connection or an RJ45 connection.

3. The on-load tap changer according to claim 1, wherein the sensor being configured to detect a temperature within an oil tank of the on-load tap changer.

4. The on-load tap changer according to claim 1, wherein the control command includes: raising a voltage of an output of the transformer;
   lowering the voltage of the output of the transformer; or
   stopping the actuator from adjusting the turn ratio ration of the transformer.

5. The on-load tap changer according to claim 1, wherein the panel includes a display configured to display the status, the status at least including times of the turn ratio having been adjusted and a position of a contact of the transformer.

6. The on-load tap changer according to claim 5, wherein the panel includes a plurality of buttons for receiving the control commands for controlling the actuator.

7. The on-load tap changer according to claim 1, wherein the panel includes a plurality of buttons for receiving the control commands for controlling the actuator.

8. An on-load tap changer, comprising:
   an actuator-configured to adjust a turn ratio of a transformer;
   a processing unit configured to control the actuator and to communicate with a control device via a digital signal connection, the processing unit being further configured to receive a status detected by a sensor, wherein the processing unit is configured to communicate at least one of a control command or the status with the control device, the processing unit being configured to control the actuator based on the control command, wherein the processing unit is irresponsive to the control command in case that at least one of the following statuses reaches a corresponding threshold:
   a current flowing through a contact of the on-load tap changer;
   a voltage of an output of the transformer; or
   a viscosity of oil in the on load tap changer;
   or in case that at least one of the following conditions occurs:
   an overcurrent of the power of the actuator;
   a slip of the contact of the on-load tap changer; or
   a power loss of the actuator.

9. An on-load tap changer, comprising:
   an actuator-configured to adjust a turn ratio of a transformer;
   a processing unit configured to control the actuator and to communicate with a control device via a digital signal connection, the processing unit being further configured to receive a status detected by a sensor, wherein the processing unit is configured to communicate at least one of a control command or the status with the control device, the processing unit being configured to control the actuator based on the control command, wherein the status including at least one of:
   an estimation of a contact wear based on a current flowing through a contact of the on-load tap changer and a material of the contact;
   times of the turn ratio having been adjusted in the on-load tap changer;
   a viscosity of oil in an oil tank of the on-load tap changer;
   a slip of the contact of the on-load tap changer;
   an overcurrent of the power of the actuator;
   a power loss of the actuator;
   a temperature within the oil tank of the on-load tap changer; or
   a position of the contact of the on load tap changer.

10. An on-load tap changer, comprising:
    an actuator configured to adjust a turn ratio of a transformer; and
    a processing unit configured to communicate a control command with a control device and control the actuator based on the control command, the processing unit being further configured to estimate a contact wear based on a current flowing through a contact of the transformer and a material of the contact of the transformer.

11. The on-load tap changer according to claim 10, wherein the processing unit is further configured to receive a status detected by a sensor, the status including at least one of:
    times of the turn ratio having been adjusted in the on load tap changer;
    a viscosity of oil in an oil tank of the on load tap changer;
    a slip of the contact of the on load tap changer;
    an overcurrent of the power of the actuator;
    a power loss of the actuator;
    a temperature within the oil tank of the on-load tap changer; or
    a position of the contact of the on load tap changer.

12. The on-load tap changer according to claim 10, wherein the processing unit is irresponsive to the control command in case that at least one of the following statuses reaches a corresponding threshold:

a current flowing through a contact of the on-load tap changer;
a voltage of an output of the transformer; or
a viscosity of oil in the on-load tap changer; or in case that at least one of the following conditions occurs:
an overcurrent of the power of the actuator;
a slip of the contact of the on-load tap changer; or
a power loss of the actuator.

13. The on-load tap changer according to claim 10, wherein the processing unit communications with the control device via a digital signal connection.

14. The on-load tap changer according to claim 13, wherein the digital signal connection is an optical fiber connection or an RJ45 connection.

15. The on-load tap changer according to claim 10, wherein the control command includes:
raising a voltage of an output of the transformer;
lowering the voltage of the output of the transformer; or
stopping the actuator from adjusting the turn ratio of the transformer.

16. The on-load tap changer according to claim 10, further comprising a panel connected to the processing unit and configured to indicate a status detected by a sensor and receive the control command for controlling the actuator.

* * * * *